US012623850B2

(12) United States Patent
Morikawa

(10) Patent No.: US 12,623,850 B2
(45) Date of Patent: May 12, 2026

(54) TRAVELING VEHICLE AND TRANSFER SYSTEM

(71) Applicant: DAIFUKU CO., LTD., Osaka (JP)

(72) Inventor: Yasushi Morikawa, Shiga (JP)

(73) Assignee: DAIFUKU CO., LTD., Osaka (JP)

( * ) Notice: Subject to any disclaimer, the term of this patent is extended or adjusted under 35 U.S.C. 154(b) by 50 days.

(21) Appl. No.: 18/461,225

(22) Filed: Sep. 5, 2023

(65) Prior Publication Data

US 2024/0124239 A1      Apr. 18, 2024

(30) Foreign Application Priority Data

Oct. 14, 2022     (JP) ................................. 2022-165842

(51) Int. Cl.
B65G 17/12 (2006.01)
(52) U.S. Cl.
CPC .................................. B65G 17/12 (2013.01)
(58) Field of Classification Search
CPC ........ B65G 17/12; B65G 35/00; B65G 41/02; B65G 43/00; B65G 2201/02; B65G 2203/0283; B65G 2203/042; B65G 35/06; B65G 1/0457; H01L 21/67706; H01L 21/67715; H01L 21/67733; B61B 3/02; B61B 13/00; B61F 9/00
See application file for complete search history.

(56) References Cited

U.S. PATENT DOCUMENTS

| | | | | |
|---|---|---|---|---|
| 8,701,864 B2 * | 4/2014 | Ogawa | ...................... | B66B 3/00 |
| | | | | 198/465.4 |
| 8,978,874 B2 * | 3/2015 | Ooe | ........................ | B65G 35/06 |
| | | | | 198/465.1 |

| | | | | |
|---|---|---|---|---|
| 2005/0139114 A1 * | 6/2005 | Nakao | ..................... | B61B 13/04 |
| | | | | 104/96 |
| 2022/0280985 A1 | 9/2022 | Park et al. | | |
| 2023/0234787 A1 * | 7/2023 | Otsuka | ................. | B65G 1/0457 |
| | | | | 198/369.1 |

FOREIGN PATENT DOCUMENTS

| | | | | |
|---|---|---|---|---|
| JP | 2005186843 A | 7/2005 | | |
| JP | 2013-256235 A | 12/2013 | | |
| JP | 2018-122700 A | 8/2018 | | |
| JP | 2018-149967 A | 9/2018 | | |
| JP | 2020131985 A | * 8/2020 | .......... | H10P 72/3202 |
| KR | 1419359 B1 | * 7/2014 | | |
| KR | 2014087293 A | * 7/2014 | | |

OTHER PUBLICATIONS

Office Action dated Jul. 22, 2025 issued in Japanese patent application No. 2022-165842.

* cited by examiner

*Primary Examiner* — Gene O Crawford
*Assistant Examiner* — Abby A Jorgensen
(74) *Attorney, Agent, or Firm* — Harness, Dickey & Pierce, P.L.C.

(57) ABSTRACT

Provided is a ceiling traveling vehicle that travels on a track including a pair of travel rails and including an upper guide rail in a branching portion, the traveling vehicle including: a body portion; a pair of travel wheels each configured to roll on a corresponding one of the travel rails; an upper guide roller configured to roll in contact with the upper guide rail; and a cam configured to adjust a position of the upper guide roller in a right-and-left direction in the body portion, depending on the branching portion.

5 Claims, 7 Drawing Sheets

FIG. 10

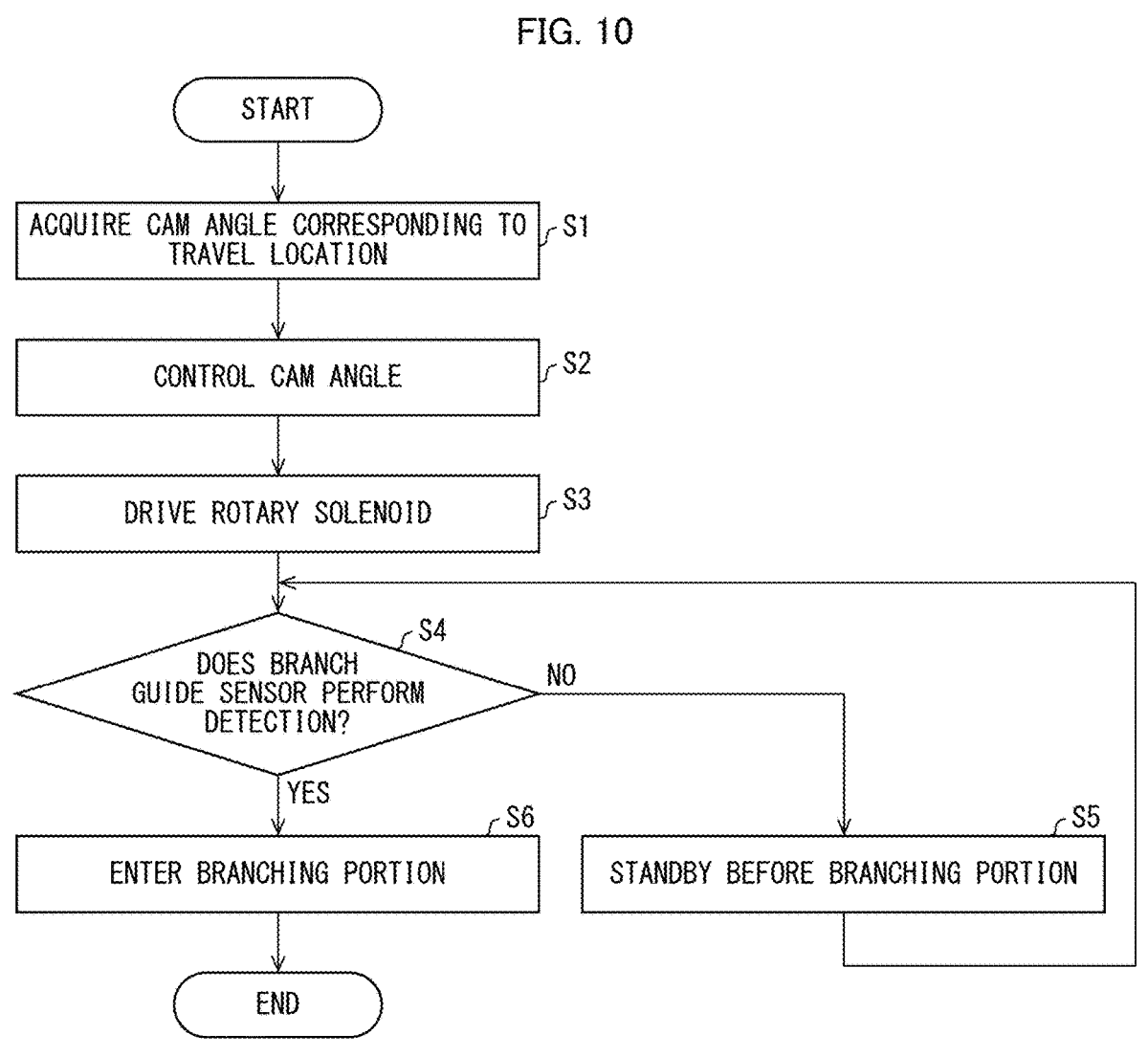

```
            ┌─────────────┐
            │    START    │
            └──────┬──────┘
                   │
   ┌───────────────▼───────────────┐
   │ ACQUIRE CAM ANGLE CORRESPONDING TO │  S1
   │         TRAVEL LOCATION         │
   └───────────────┬───────────────┘
                   │
   ┌───────────────▼───────────────┐
   │       CONTROL CAM ANGLE        │  S2
   └───────────────┬───────────────┘
                   │
   ┌───────────────▼───────────────┐
   │     DRIVE ROTARY SOLENOID      │  S3
   └───────────────┬───────────────┘
                   │
              ╱─────────╲   S4
            ╱  DOES BRANCH ╲
          ╱ GUIDE SENSOR PERFORM ╲  NO
          ╲     DETECTION?     ╱────────┐
            ╲               ╱           │
              ╲───────────╱             │
                   │ YES                │
   ┌───────────────▼───────────────┐    ┌─────▼───────────────────────────┐
   │    ENTER BRANCHING PORTION     │ S6 │ STANDBY BEFORE BRANCHING PORTION │ S5
   └───────────────┬───────────────┘    └──────────────┬──────────────────┘
                   │                                     │
            ┌──────▼──────┐                              │
            │     END     │                              │
            └─────────────┘
```

TRAVELING VEHICLE AND TRANSFER SYSTEM

This Nonprovisional application claims priority under U.S.C. § 119 on Patent Application No. 2022-165842 filed in Japan on Oct. 14, 2022, the entire contents of which are hereby incorporated by reference.

TECHNICAL FIELD

The present invention relates to traveling vehicles.

BACKGROUND ART

Traveling vehicles have been used in clean rooms, factories, hospitals, libraries, and the like. Such a traveling vehicle, such as a ceiling traveling vehicle, transfers an article along a track. A traveling vehicle can transfer an article to various locations inside a building through a track network formed with tracks branching and joining.

At a point where a track branches, either the right or left of a pair of travel rails is interrupted depending on the travel direction, and only one of the right and left wheels runs on the travel rail. It is difficult to keep the posture of the traveling vehicle only with a single wheel. Therefore, at such a branching point, the traveling vehicle runs while being supported by an upper guide rail, which is separated from the travel rail. That is, the traveling vehicle may run such that one of the wheels is in contact with the travel rail and an upper guide roller is in contact with the upper guide rail.

CITATION LIST

Patent Literature

[Patent Literature 1]
   Japanese Patent Application Publication Tokukai No. 2005-186843

SUMMARY OF INVENTION

Technical Problem

There is a concern that the ceiling traveling vehicle cannot run smoothly at the branching portion of the track, because there is a limit on the extent to which the construction accuracy of the travel rail and the upper guide rail can increase.

An object of an aspect of the present invention is to provide a traveling vehicle capable of accurately maintaining the traveling posture and smoothly traveling even in a branching portion of a track.

Solution to Problem

To achieve the object, a traveling vehicle in accordance with an aspect of the present invention is a traveling vehicle that travels on a track including a pair of travel rails and including a guide rail in a branching portion, the traveling vehicle including: a body portion; a pair of wheels each configured to roll on a corresponding one of the pair of travel rails; a guide roller configured to roll in contact with the guide rail; and an adjusting mechanism configured to adjust a position of the guide roller in a right-and-left direction in the body portion, depending on a plurality of the branching portions of the track.

Advantageous Effects of Invention

According to an aspect of the present invention, the traveling vehicle can travel while maintaining its posture at a branching portion of the track.

BRIEF DESCRIPTION OF DRAWINGS

FIG. 10 is an example of a flowchart for the ceiling traveling vehicle.

DESCRIPTION OF EMBODIMENTS

Embodiment

The following description will discuss in detail an embodiment of the present invention.

(Configuration of Ceiling Traveling Vehicle 1)

Figure 1:
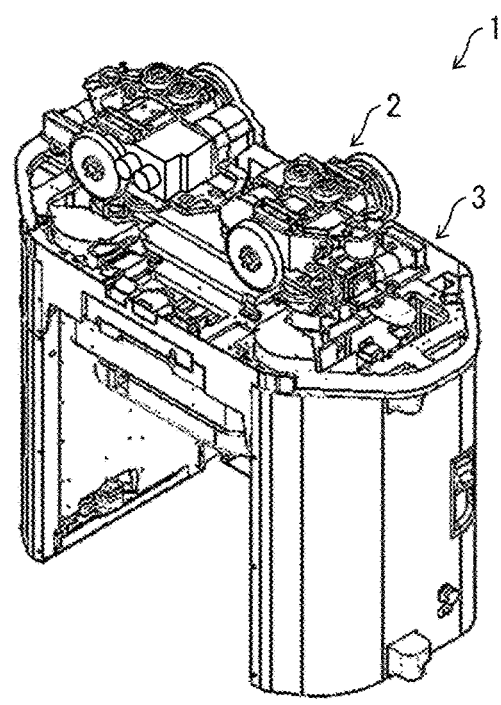
FIG. 1 is a perspective external view of a ceiling traveling vehicle.

FIG. 1 is a perspective external view of a ceiling traveling vehicle 1. The ceiling traveling vehicle 1 includes a travel unit 2 configured to run on a track such as a travel rail, and a carriage unit 3 configured to transfer an article.

Figure 2:
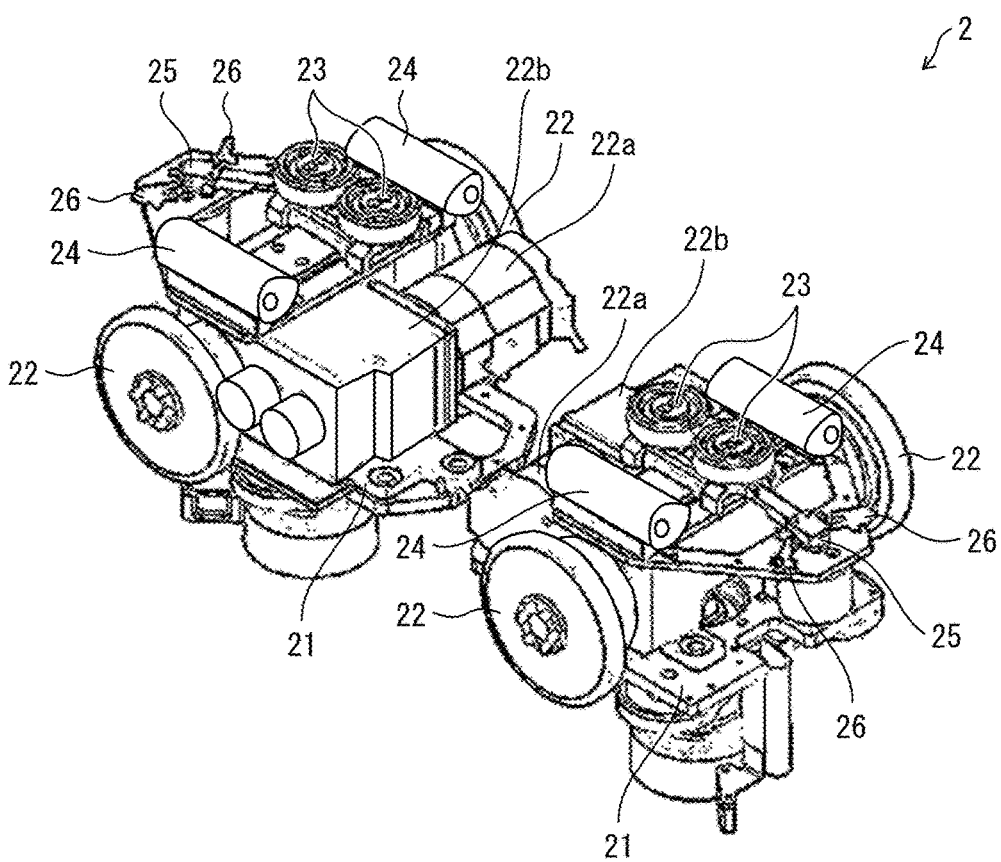
FIG. 2 is a perspective external view of a travel unit.

FIG. 2 is a perspective external view of the travel unit 2. The travel unit 2 is divided into front and rear parts. Each part includes a body portion 21, a pair of travel wheels 22, an upper guide roller (guide roller) 23, a pair of cams (adjusting mechanism) 24, a rotary solenoid 25, and a branch guide sensor 26.

The body portion 21 is a body on which each component of the travel unit 2 are secured. In the travel unit 2, the body portions 21 are arranged in the front-and-rear direction and are fastened with a pin. This enables the travel unit 2 to easily run even on a curved track.

The travel wheels 22 are wheels each configured to run on the travel rail, and are for use in traveling of the ceiling traveling vehicle 1. In each of the front and rear parts of the travel unit 2, the travel wheels 22 are a pair of wheels. The travel wheels 22 are driven to rotate by rotational motion of the travel motor 22a having the rotational speed reduced by a speed reducer 22b.

The upper guide roller 23 has a function of maintaining the posture of the ceiling traveling vehicle 1 by rotating in contact with the upper guide rail. The upper guide roller 23 may be a single upper guide roller 23 or may be multiple (e.g., two) upper guide rollers 23 arranged in a direction in which the upper guide rail extends.

Each of the cams 24 is a cam whose angle is made variable by a manipulating motor, and its radial length varies depending on the angle.

The rotary solenoid 25 is a mechanism that moves the upper guide roller 23 in the right-and-left direction with respect to the body portion 21 to bring the upper guide roller 23 into contact with the upper guide rail.

The rotary solenoid 25 moves the upper guide roller 23, and a member for retaining the upper guide roller 23 (upper guide roller regulating portion 23a, described later) is brought into contact with the cam 24 and is stopped thereby. This defines the position of the upper guide roller 23.

The branch guide sensor 26 is a sensor for determining whether the upper guide roller 23 is at a right or left position. As the branch guide sensor 26, a photoelectric sensor or the like may be used. Since such a sensor has a wide detection range, it is possible to detect the position of the upper guide roller 23 even when the position of the upper guide roller 23 varies to some extend owing to the cam 24.

(Track 4)

Figure 3:
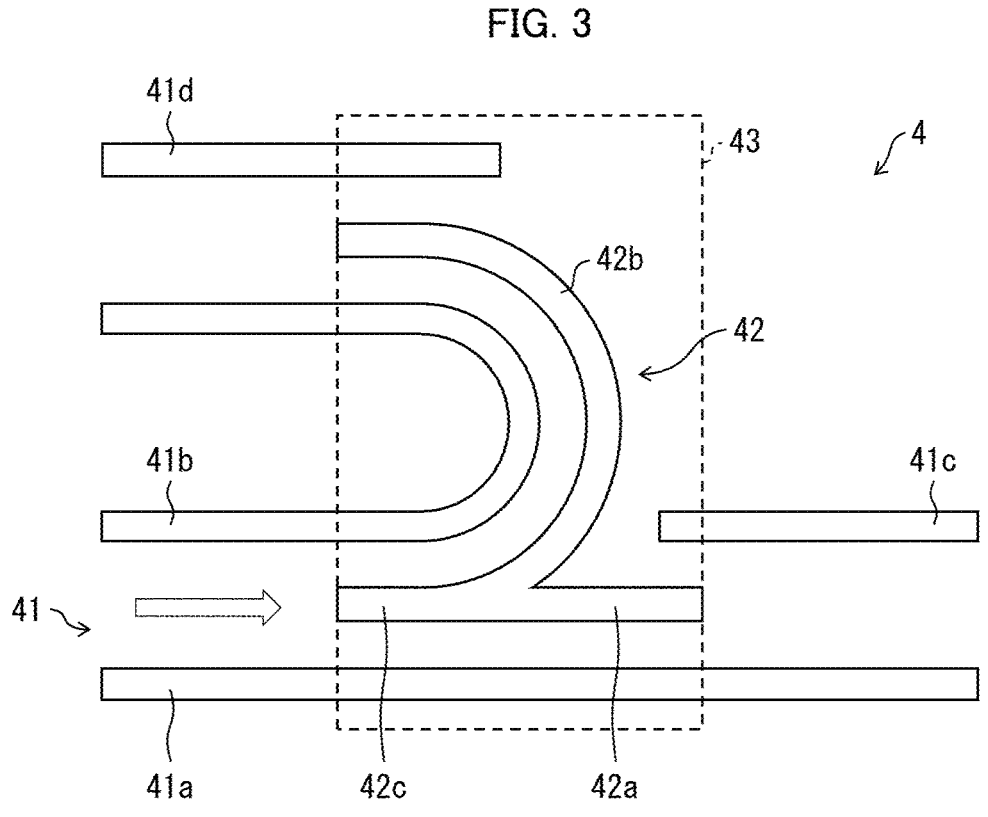
FIG. 3 is a top view of a track on which the ceiling traveling vehicle runs.

FIG. 3 is a top view of the track 4 on which the ceiling traveling vehicle 1 runs. The track 4 includes a travel rail 41 and an upper guide rail (guide rail) 42. In the example illustrated in FIG. 3, the track 4 branches in two directions in a branching portion 43; one of the two branches runs straight and the other is made to turn by 180°.

The travel rail 41 is a rail on which the ceiling traveling vehicle 1 runs and that is configured to support the weight of the ceiling traveling vehicle 1. The travel rail 41 includes a travel rail 41a extending on the right side in the travel direction and a travel rail 41b extending on the left side in the travel direction. Further, the travel rail 41 also includes additional travel rails 41c and 41d subsequent to the branching portion 43.

The upper guide rail 42 is a rail that is separated from the travel rail 41 and is disposed above the travel rail 41. The upper guide rail 42 includes: an upper guide rail section 42a used when the ceiling traveling vehicle 1 goes straight forward; an upper guide rail section 42b used when the ceiling traveling vehicle 1 is made to turn by 180°; and an upper guide rail section 42c in which the upper guide rail sections 42a and 42b join.

The upper guide rail 42 is located above the travel rail 41 and the installation height of the upper guide rail 42 is set such that the upper guide roller 23 contacts the upper guide rail 42.

The branching portion 43 has such a shape that the track 4 is formed to have a straight branch and a 180-degree-turn branch, but this is for illustrative purposes, and is not limited thereto; any branching method may be used.

(How Ceiling Traveling Vehicle 1 Passes Through Branching Portion 43)

Figure 4:
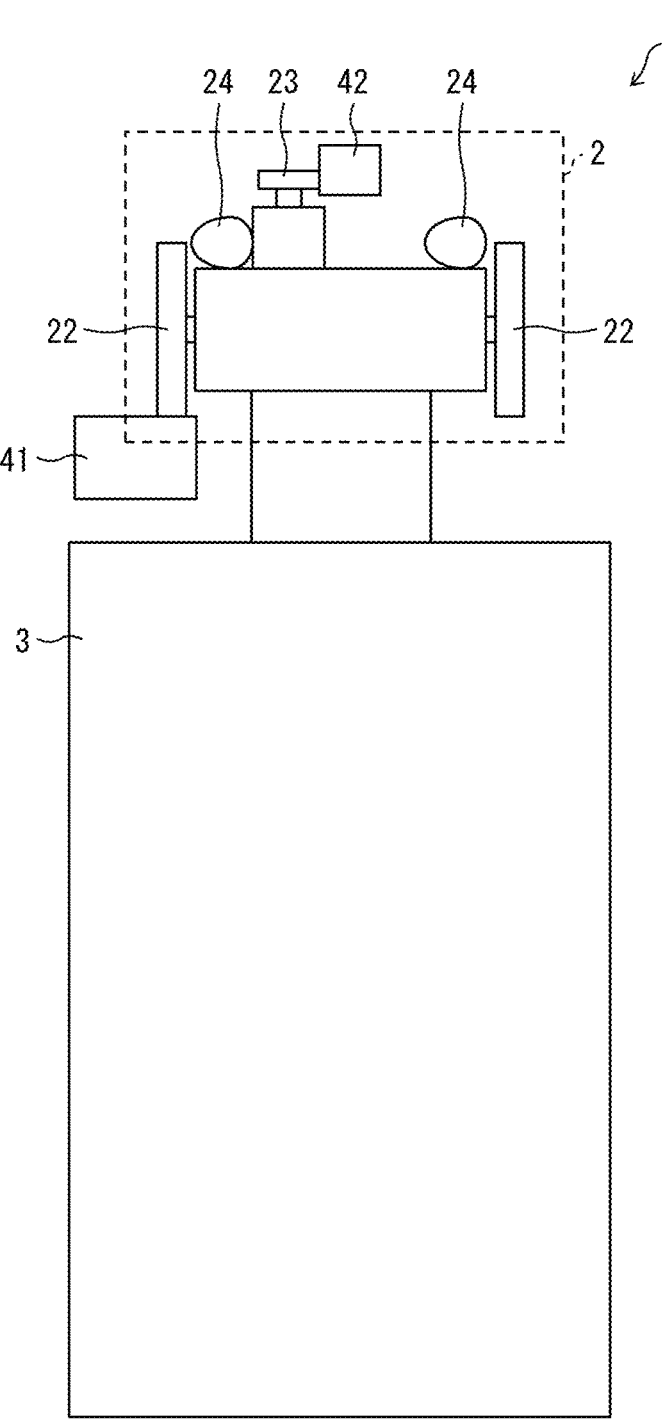
FIG. 4 is a front view of the travel unit in a branching portion during traveling.

FIG. 4 is a front view of the travel unit 2 in the branching portion 43 during traveling.

First, a case in which the ceiling traveling vehicle 1 goes straight in the branching portion 43 will be described. The traveling wheels 22 on the right side in the traveling direction keep rolling on the travel rail 41a by friction. In contrast, the traveling wheels 22 on the left side in the traveling direction float in the air and are not in contact with any rail when the ceiling traveling vehicle 1 passes through the branching portion 43.

The upper guide roller 23 contacts the upper guide rail sections 42a and 42c and rolls thereon by friction. Accordingly, the travel rail 41 and the upper guide rail 42 are disposed to the right and left of the center of gravity of the ceiling traveling vehicle 1; this maintains the posture of the ceiling traveling vehicle 1.

After passing through the branching portion 43, the traveling wheels 22 on the left side in the traveling direction floating in the air come into contact with the travel rail 41c and roll on the travel rail 41c by friction. Thereafter, the upper guide rail 42 ends, and the upper guide roller 23 stops rolling.

Next, a case in which the ceiling traveling vehicle 1 is made to turn by 180° in the branching portion 43 will be described. The traveling wheels 22 on the left side in the traveling direction keep rolling on the travel rail 41b by friction. In contrast, the traveling wheels 22 on the right side in the traveling direction float in the air and are not in contact with any rail when the ceiling traveling vehicle 1 passes through the branching portion 43.

The upper guide roller 23 contacts the upper guide rail sections 42b and 42c and rolls thereon by friction. Accordingly, the travel rail 41 and the upper guide rail 42 are disposed to the right and left of the center of gravity of the ceiling traveling vehicle 1; this maintains the posture of the ceiling traveling vehicle 1.

After passing through the branching portion 43, the traveling wheels 22 on the right side in the traveling direction floating in the air come into contact with the travel rail 41d and roll on the travel rail 41d by friction. Thereafter, the upper guide rail 42 ends, and the upper guide roller 23 stops rolling.

Reference Example: Behavior Before and After Branching Portion 43

Here, as a reference example, the following description will discuss a case in which no cams 24 are provided and the upper guide roller 23 is configured to be positioned in two positions by means of the rotary solenoid 25 that moves the upper guide roller 23 in such a manner as to press the upper guide roller 23 against fixed positions set at both sides of the body portion 21.

The upper guide roller 23 is positioned at either of the following positions by the rotary solenoid 25: a first position for bringing the ceiling traveling vehicle 1 to run on the travel rail 41c after the branching portion 43 (to go straight); and a second position for bringing the ceiling traveling vehicle 1 to run on the travel rail 41d after the branching portion 43 (to turn by 180°).

In the branching portion 43, the upper guide roller 23 needs to roll on the upper guide rail 42. Since the above-mentioned positions of the upper guide roller 23 are fixed positions, the position of an outer peripheral surface of the upper guide roller 23 and that of a side surface of the upper guide rail 42 may become misaligned.

If the upper guide roller 23 and the upper guide rail 42 coincide with each other, the upper guide roller 23 can be brought into contact with the upper guide rail 42 in a lightly colliding manner when the upper guide rail 42 starts guiding. This gives an impact to the body portion 21. This also makes the posture of the body portion 21 inclined to such an angle that the upper guide roller 23 contacts the upper guide rail 42. Therefore, when the ceiling traveling vehicle 1 passes through the branching portion 43 and the traveling wheels 22 floating in the air come into contact with the travel rail 41 again, the body portion 21 drops and again receives an impact thereby.

If an excessive clearance is present between the upper guide roller 23 and the upper guide rail 42, and when the travel rail 41 on one side ends and the upper guide roller 23 starts contacting the upper guide rail 42, the posture is inclined to such an angle that the upper guide roller 23 contacts the upper guide rail 42. This gives an impact to the body portion 21. Further, this also makes the posture of the body portion 21 inclined to bring the upper guide roller 23 into contact with the upper guide rail 42. Therefore, when the body portion 21 passes through the branching portion 43 and the traveling wheels 22 floating in the air come into contact with the travel rail 41 again, the body portion 21 overrides the travel rail 41 and again receives an impact thereby.

Therefore, the positional relationship between the travel rail 41, the upper guide rail 42, and the upper guide roller 23 needs to be accurate. However, it is difficult to accurately adjust the relationship between the travel rail 41, the upper guide rail 42, and the upper guide roller 23. This problem can be solved by adjusting the position of the upper guide roller 23 by using the adjusting mechanism (cams 24).

(Operation of Cams 24)

Figure 5:
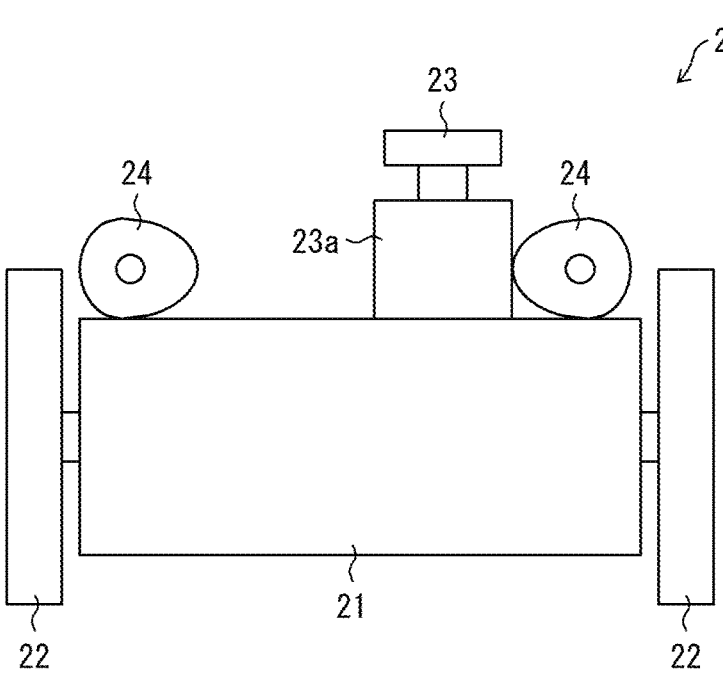
FIG. 5 is a front view of the travel unit, illustrating the operation of cams under a circumstance.
Figure 6:
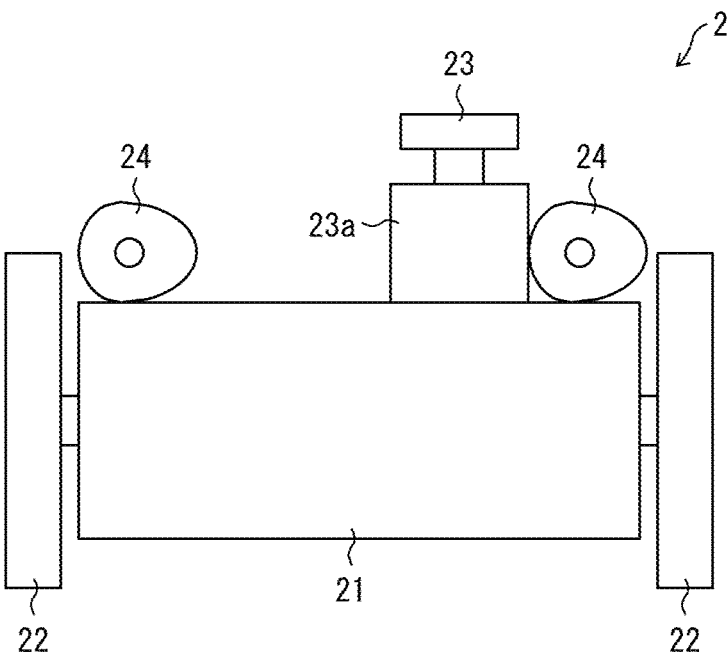
FIG. 6 is a front view of the travel unit, illustrating the operation of the cams under another circumstance.
Figure 7:
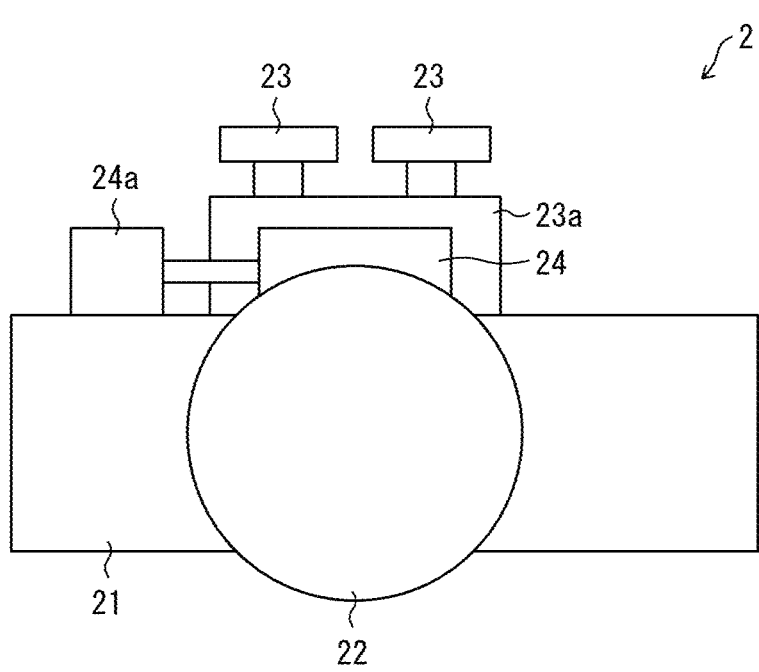
FIG. 7 is a side view of the travel unit.
Figure 8:
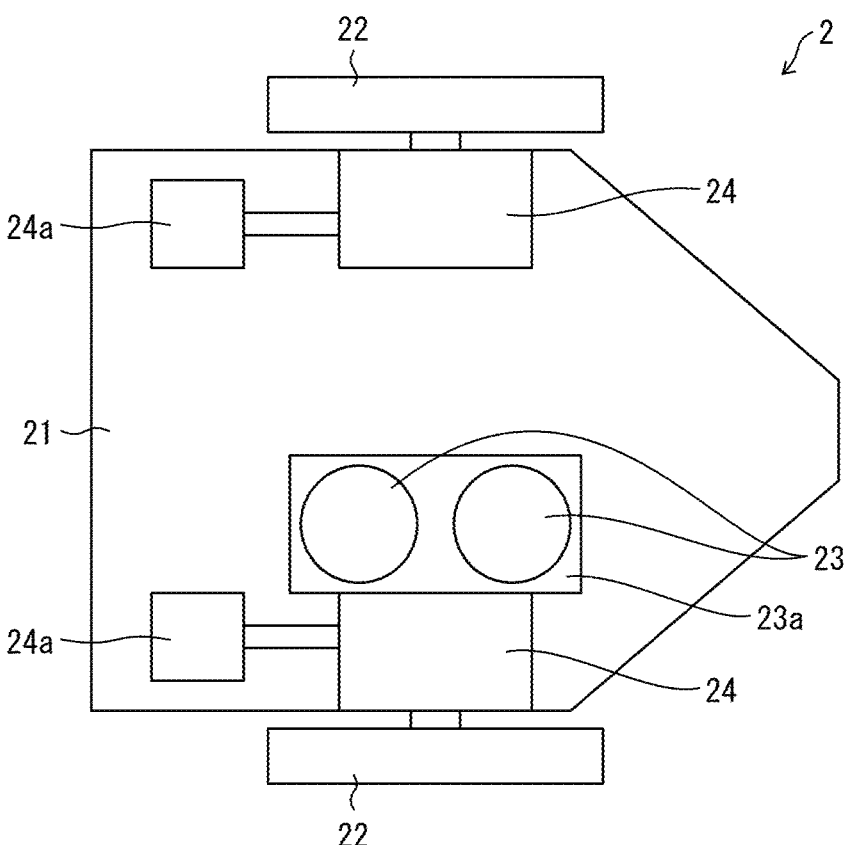
FIG. 8 is a top view of the travel unit.

Next, the behavior of the ceiling traveling vehicle 1 in accordance with the present embodiment around the branching portion 43 will be described. FIG. 5 is a front view of the travel unit 2, illustrating the operation of the cams 24 under a circumstance. FIG. 6 is a front view of the travel unit 2, illustrating the operation of the cams 24 under another circumstance. FIG. 7 is a side view of the travel unit 2. FIG. 8 is a top view of the travel unit 2.

The upper guide roller 23 is rotatably secured to the upper guide roller regulating portion 23a. The upper guide roller regulating portion 23a is movably secured to the body portion 21 in the right-to-left direction. Further, the installation height of the upper guide roller regulating portion 23a relative to the body portion 21 is the same as the installation height of the cams 24 relative to the body portion 21. The rotary solenoid 25 brings the upper guide roller regulating portion 23a into contact with the cams 24.

Further, the angle of each cam 24 can be varied by a manipulating motor 24a. Thus, since the angle of the cam 24 is variable, it is possible to change the position at which the upper guide roller regulating portion 23a comes into contact with the cam 24. This enables the position of the upper guide roller 23 to be adjusted in the right-to-left direction with respect to the body portion 21.

Comparing FIGS. 5 and 6, the right cam 24 differs in angle. In FIG. 5, the upper guide roller 23 is positioned closer to the center, whereas, in FIG. 6, the upper guide roller 23 is positioned more outwardly. This difference is caused by the difference in angle of the cam 24. This is because rotating the cam 24 changes the position of the upper guide roller regulating portion 23a to which the upper guide roller 23 is secured.

That is, by adjusting the radius of the cam 24 at the point of contact with the upper guide roller regulating portion 23a, it is possible to finely adjust the position of the upper guide roller 23 in the right-to-left direction. Thus, it is possible to allow the ceiling traveling vehicle 1 to enter the branching portion 43 in a state in which the position of the outer peripheral surface of the upper guide roller 23 and that of the side surface of the upper guide rail 42 are aligned. Therefore, the ceiling traveling vehicle 1 can enter the branching portion 43 without receiving any impact.

In addition, during the ceiling traveling vehicle 1 traveling in the branching portion 43, it is also possible to adjust the position of the upper guide roller 23 by the cams 24 at a position at which the branching portion 43 ends and the upper guide rail 42 is required. Thus, even when the ceiling traveling vehicle 1 exits from the branching portion 43, it is possible to prevent the ceiling traveling vehicle 1 from receiving an impact.

Therefore, by providing the ceiling traveling vehicle 1 with the cams 24, it is possible to accurately maintain the traveling posture and to achieve smooth travel even in the branching portion 43 of the track 4.

(Block Diagram)

Figure 9:
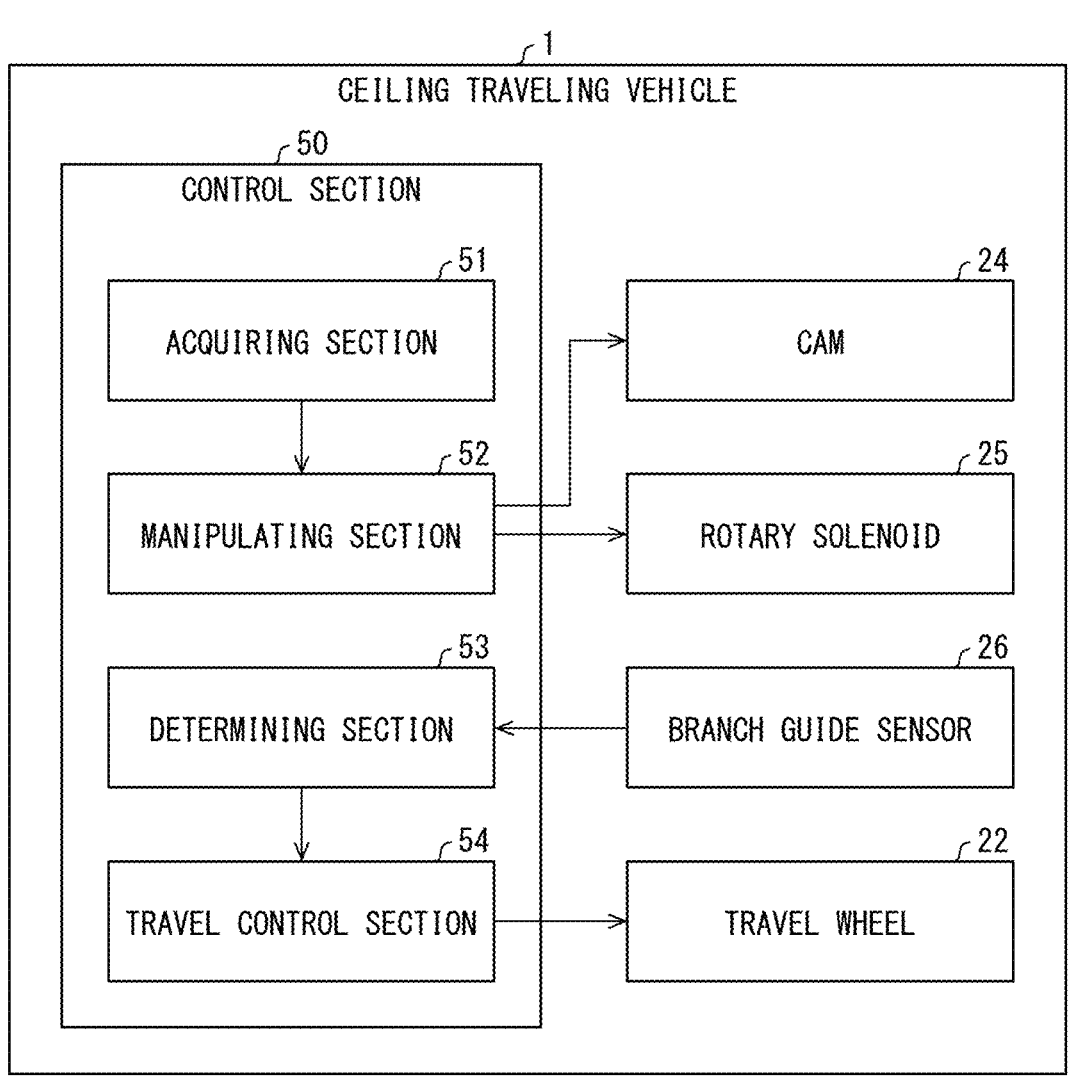
FIG. 9 is a block diagram illustrating the configuration of a main part of a control section of the ceiling traveling vehicle.

The ceiling traveling vehicle 1 further includes a control section 50. FIG. 9 is a block diagram illustrating the configuration of a main part of the control section 50 of the ceiling traveling vehicle 1. The control section 50 comprehensively manages and controls each section of the ceiling traveling vehicle 1. The control section 50 includes an acquiring section 51, a manipulating section 52, a determining section 53, and a travel control section 54.

The acquiring section 51 is configured to acquire an appropriate angle of the cam 24 based on the current position of the ceiling traveling vehicle 1. The acquiring section 51 may obtain the current position from a QR code (registered trademark) attached to the travel rail, and inquire about an angle of the cam 24 corresponding to the current position, stored on the server. The acquiring section 51 outputs the acquired appropriate angle (appropriate value) to the manipulating section 52.

The manipulating section 52 configured to drive the cams 24 and the rotary solenoid 25. The manipulating section 52 controls the cam 24 to have an angle acquired by the acquiring section 51. Then, the manipulating section 52 controls the rotary solenoid 25.

The determining section 53 is configured to determine whether the upper guide roller 23 has been positioned at a predetermined position on the basis of an output of the branching guide sensor 26. The determining section 53 outputs the determination result to the travel control section 54.

The travel control section 54 is configured to cause the traveling wheels 22 to roll to make the ceiling traveling vehicle 1 travel in the branching portion 43, when receiving the determination result of the determining section 53 indicating that the upper guide roller 23 has been positioned at the predetermined position.

Operation Example

FIG. 10 is an example of a flowchart for the ceiling traveling vehicle 1.

The acquiring section 51 acquires an operation angle of the cam 24 based on the position of the ceiling traveling vehicle 1 (S1). The acquiring section 51 outputs the acquired operation angle to the manipulating section 52, and the manipulating section 52 controls the cam 24 to have the operation angle (S2).

Then, the manipulating section 52 drives the rotary solenoid 25 to bring the upper guide roller regulating portion 23a into contact with the cam 24 (S3). At this time, the determining section 53 determines whether the movement of the upper guide roller regulating portion 23a has been completed, based on an output of the branching guide sensor 26 (S4). If the movement is not completed, the ceiling traveling vehicle 1 is put on standby before the branching portion 43 until the movement of the upper guide roller regulating portion 23a is completed (S5).

After completion of the movement of the upper guide roller regulating portion 23a, the travel control section 54 causes the travel wheels 22 to roll so that the ceiling traveling vehicle 1 enters the branching portion 43.

Variations

In Embodiment 1, during the ceiling traveling vehicle 1 running on a track, its posture is maintained by the travel rail 41 and the upper guide rail 42 located above the travel rail
41. However, the posture of the ceiling traveling vehicle 1
may be maintained by the traveling rail 41 and a guide rail
located at the same height as the travel rail 41 or below the
travel rail 41. In this case, the ceiling traveling vehicle may
include, instead of the upper guide roller 23, a guide roller
configured to contact and roll on the guide rail.

Note that the function of the guide rail is the same as that
of the upper guide rail 42, and the function of the guide roller
is the same as that of the upper guide roller 23. That is,
although the upper guide roller 23 and the upper guide rail
42 maintain the posture of the ceiling traveling vehicle 1 in
Embodiment 1, the guide roller and the guide rail maintain
the posture of the ceiling traveling vehicle in the present
variation.

Further, the guide roller may be in contact not only with
the side surface of the guide rail but also with the upper
surface of the guide rail. In this case, since the weight of the
ceiling traveling vehicle can also be supported by the guide
rail, the stability is improved.

The traveling vehicle is not limited to the ceiling traveling
vehicle that runs on a track provided on the ceiling; the
traveling vehicle only needs to be a traveling vehicle that
runs on any kind of track. For example, the traveling vehicle
may be a traveling vehicle that runs, holding an article on the
travel unit.

It should be noted that the adjusting mechanism for
positioning the upper guide roller 23 is not limited to the
cams 24. For example, the upper guide roller regulating
portion 23a may be driven by a motor (rotational or linear
motion) to carry out positioning. Further, the upper guide
roller regulating portion 23a may be installed by means of
a floating mechanism such as a spring. That is, the adjusting
mechanism may be any mechanism capable of adjusting the
position of the upper guide roller 23 in the right-to-left
direction in the body portion 21.

Aspects of the present invention can also be expressed as
follows:

To achieve the abovementioned object, a traveling vehicle
in accordance with Aspect 1 of the present invention is a
traveling vehicle that travels on a track including a pair of
travel rails and including a guide rail in a branching portion,
the traveling vehicle including: a body portion; a pair of
wheels each configured to roll on a corresponding one of the
pair of travel rails; a guide roller configured to roll in contact
with the guide rail; and an adjusting mechanism configured
to adjust a position of the guide roller in a right-and-left
direction in the body portion, depending on a plurality of the
branching portions of the track.

This configuration enables the adjusting mechanism to
adjust the position in the right-to-left direction of the guide
roller that rolls in contact with the guide rail. Therefore, the
position of the guide roller can be aligned with the instal-
lation position of the guide rail. Therefore, it is possible to
prevent an impact or the like from being applied when the
guide roller comes into contact with the guide rail and rolls,
so that the traveling vehicle can travel while maintaining its
posture.

A traveling vehicle in accordance with Aspect 2 of the
present invention may employ, in addition to the configu-
ration of Aspect 1, a configuration in which, in the track, the
guide rail is installed above the travel rails.

This configuration enables the guide rail to be installed
above the travel rails. Therefore, it is possible to provide
space under the track and to install the track by utilizing an
empty space near the ceiling.

A traveling vehicle in accordance with Aspect 3 of the
present invention may employ, in addition to the configu-
ration of Aspect 1 or 2, a configuration in which: the guide
roller is configured to be positioned at either a first position
for bringing the traveling vehicle to run on a right branch
track in the branching portion or a second position for
bringing the traveling vehicle to run on a left branch track in
the branching portion, the first position and the second
position being separated from each other in the right-to-left
direction in the body portion; and the adjusting mechanism
is a mechanism for further adjusting, in the right-to-left
direction, the position of the guide roller at the first position
and at the second position.

With this configuration, it is possible to branch a track on
which the traveling vehicle runs. Further, by switching the
position of the guide roller between the first position and the
second position in the branching portion, the traveling
vehicle can travel while maintaining its posture.

A traveling vehicle in accordance with Aspect 4 of the
present invention may employ, in addition to the configu-
ration of any one of Aspects 1 to 3, a configuration in which
the adjusting mechanism is a mechanism for performing
positioning by using a cam.

With this configuration, a cam can be used as the adjusting
mechanism. Thus, since it is configured so that the position
of the guide roller is changed by changing the angle of the
cam, the position at which the pressing against the cam takes
place can be changed. Therefore, it is possible to perform
positioning with high accuracy and high rigidity. This
enables the guide roller to easily support the weight of the
traveling vehicle.

A traveling vehicle in accordance with Aspect 5 of the
present invention may employ, in addition to the configu-
ration of any one of Aspects 1 to 4, a configuration in which,
when the guide roller is positioned at the first position, the
guide rail is located to the left of the guide roller, and when
the guide roller is positioned at the second position, the
guide rail is located to the right of the guide roller.

With this configuration, when the guide roller is posi-
tioned at the first position, the guide rail can be located to the
left of the guide roller, whereas, when the guide roller is
positioned at the second position, the guide rail can be
located to the right of the guide roller. Therefore, the
traveling vehicle can be supported from both sides, that is,
one side by one of the travel rails and the other side by the
guide rail, and the traveling vehicle can travel with a stable
posture even in the branching portion.

A traveling vehicle in accordance with Aspect 6 of the
present invention may employ, in addition to the configu-
ration of any one of Aspects 1 to 5, a configuration of further
including a control section, wherein the control section
includes: an acquiring section configured to acquire, for
each travel location, an appropriate position of the guide
roller based on which the adjusting mechanism is operated;
and a manipulating section configured to manipulate the
adjusting mechanism to position the guide roller at the
appropriate position.

With this configuration, it is possible to position the guide
roller at an appropriate position. Therefore, it is possible to
prevent an impact from being applied to the traveling
vehicle.

To achieve the abovementioned object, a transfer system
in accordance with Aspect 7 of the present invention
includes: a traveling vehicle; and the track.

This configuration enables the traveling vehicle to travel on the track while maintaining its posture.

ADDITIONAL REMARKS

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1 Ceiling traveling vehicle (traveling vehicle)
2 Travel unit
3 Carriage unit
4 Track
21 Body portion
22 Travel wheels
22*a* Travel motor
23 Upper guide roller (guide roller)
23*a* Upper guide roller regulating portion
24 Cams (adjusting mechanism)
24*a* Manipulating motor
25 Rotary solenoid
26 Branch guide sensor
41, 41*a* to 41*d* Travel rails
42, 42*a* to 42*c* Upper guide rail and upper guide rail sections (guide rail)
43 Branching portion
50 Control section
51 Acquiring section
52 Manipulating section
53 Determining section
54 Travel control section

The invention claimed is:

1. A traveling vehicle that travels on a track including a pair of travel rails and including a guide rail in a branching portion, the traveling vehicle comprising:
   a body portion;
   a pair of wheels each configured to roll on a corresponding one of the pair of travel rails;
   a guide roller configured to roll in contact with the guide rail;
   an adjusting mechanism configured to adjust a position of the guide roller in a right-and-left direction in the body portion;

a driven member movable in the right-and-left directions and configured to retain the guide roller in a selected position; and
   a mechanism configured to, together with the driven member configured to retain the guide roller, move the guide roller in the right-and-left direction, wherein
   the guide roller is configured to be positioned, by the mechanism configured to move the guide roller in the right-and-left direction, at either a first position for bringing the traveling vehicle to run on a right branch track in the branching portion or a second position for bringing the traveling vehicle to run on a left branch track in the branching portion, the first position and the second position being separated from each other in the right-to-left direction in the body portion, and
   the adjusting mechanism is a mechanism configured to (i) change a position at which the driven member, configured to retain the guide roller, comes into and out of contact with the adjusting mechanism and (ii) thereby further adjust, in the right-to-left direction and depending on each of a plurality of the branching portions of the track, the position of the guide roller at the first position and at the second position at which the guide roller is positioned by the mechanism configured to move the guide roller in the right-and-left direction.

2. The traveling vehicle according to claim 1, wherein, in the track, the guide rail is installed above the travel rails.

3. The traveling vehicle according to claim 1, wherein the adjusting mechanism is a mechanism for performing positioning by using a cam.

4. The traveling vehicle according to claim 1, wherein
   when the guide roller is positioned at the first position, the guide rail is located to the left of the guide roller, and
   when the guide roller is positioned at the second position, the guide rail is located to the right of the guide roller.

5. The traveling vehicle according to claim 1, further comprising a control section,
   wherein the control section comprises:
      an acquiring section configured to acquire, for each travel location, an appropriate position of the guide roller based on which the adjusting mechanism is operated; and
      a manipulating section configured to manipulate the adjusting mechanism by driving the driven member in right and left directions to position the guide roller at the appropriate position.

* * * * *